(12) United States Patent
Kim (10) Patent No.: US 6,281,812 B1
(45) Date of Patent: Aug. 28, 2001

(54) COMPUTER HAVING LED DISPLAY KEYBOARD DEVICE

(75) Inventor: Chong-In Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/219,874

(22) Filed: Dec. 24, 1998

(30) Foreign Application Priority Data

Dec. 24, 1997 (KR) .................................................. 97-73375

(51) Int. Cl.[7] .................................................. H03K 17/94
(52) U.S. Cl. .................. 341/23; 341/22; 341/20; 200/5 A; 200/314; 400/495
(58) Field of Search .................. 400/495, 490; 341/20, 22, 23; 361/680; 200/314, 5 A (56) References Cited

U.S. PATENT DOCUMENTS

| | | | | |
|---|---|---|---|---|
| 3,865,994 | * | 2/1975 | Bender .................................. | 708/109 |
| 4,088,837 | * | 5/1978 | Singer .................................. | 379/422 |
| 4,100,402 | * | 7/1978 | Lundstrom et al. ............. | 235/145 R |
| 4,163,138 | | 7/1979 | Harden .................................. | 200/310 |
| 4,163,883 | | 8/1979 | Boulanger ............................ | 300/314 |
| 4,311,990 | | 1/1982 | Burke .................................... | 341/31 |
| 4,491,692 | | 1/1985 | Lee ........................................ | 362/24 |
| 4,551,717 | | 11/1985 | Dreher .................................. | 345/170 |
| 4,772,769 | | 9/1988 | Shumate ............................... | 200/314 |
| 5,164,723 | | 11/1992 | Nebenzahl ............................ | 341/23 |
| 5,253,940 | * | 10/1993 | Abecassis ............................. | 400/495 |
| 5,266,949 | | 11/1993 | Rossi ..................................... | 341/22 |
| 5,408,060 | | 4/1995 | Munrinen ............................. | 200/314 |
| 5,736,942 | * | 4/1998 | Randolph ............................. | 341/22 |
| 5,801,345 | | 9/1998 | Mikula-Curtis et al. ............ | 200/5 A |
| 5,818,361 | | 10/1998 | Acevedo ............................... | 341/23 |
| 6,035,214 | * | 3/2000 | Henderson ........................... | 455/556 |

* cited by examiner

Primary Examiner—Michael Horabik
Assistant Examiner—Albert K. Wong
(74) Attorney, Agent, or Firm—Robert E. Bushnell, Esq.

(57) ABSTRACT

A computer having a light emitting diode (LED) display keyboard device is disclosed. The computer includes a LED display keyboard device, a display device, a central processing unit, a ROM, a RAM, and a system bus, the LED display keyboard device comprises a number lock (Num Lock) key for activating numeral function keys on a keyboard; a telephone lock key for activating telephone function keys on a keyboard; a controller for lightening function keys corresponding to a Num Lock key signal and a telephone lock key signal respectively; and a fight emitting device for being activated by a control signal from the controller.

17 Claims, 9 Drawing Sheets

COMPUTER HAVING LED DISPLAY KEYBOARD DEVICE

FIELD OF THE INVENTION

The present invention relates to a computer having a light emitting diode (LED) display keyboard device, and more particularly to a computer which lights numeral function keys on a numeric pad/portion of a keyboard by LED during calculation or dialing mode.

DESCRIPTION OF THE RELATED ART

Computers are used over a wide range of environments from offices to households, but generally have keyboards which are used as an input device, recognizing an input from individual keys electronically or mechanically. A conventional desk-top computer has a numeric pad located on the right portion is of a keyboard. During use, when a need to use numeral function keys for a calculation arises, a user can simply activate only the numeral function keys on the numeric pad by pushing a number lock (Num Lock) key, and a Num Lock mode display located on the top of the keyboard lights up. Although the Num Lock mode display is located on the keyboard along with displays for other functions, it is not readily apparent to a user and serves only as a minimal reminder. Failure to notice the display causes inconvenience and typographical errors.

In portable computers, a numeric portion is located in the center of a keyboard. Similarly to the desk top computers, a user can activate the numeral function keys of the numeric portion by simply pushing its Num Lock key. Unlike the desk top computers, the numeral function keys are inconveniently located in the center of the keyboard and indicated by small numbers. Thus, it is even easier for a user to be confused about the function of the keys, consequently resulting in typographical errors.

Devices with the purpose of making it easier for the user to locate keys of a keyboard are seen, for example, in the following U.S. Patents. U.S. Pat. No. 4,311,990, to Burke, entitled Photo-Optical Keyboards, discusses a keyboard with a matrix of light sources, such as LEDs, and photodetectors beneath the keys, and the keys being transparent to allow illumination from below. This patent mainly deals with a method of detecting depression of the keys, and does not allow for selective illumination of keys. U.S. Pat. No. 5,266,949, to Rossi, entitled Lighted Electronic Keyboard describes a keyboard with keys having a light source which transmits light to illuminate the key. The patent does not discuss lighting of selected keys. U.S. Pat. No. 4,491,692, to Lee, entitled Light-Emitting Device Mounted Under Key Buttons of a Keyboard, describes a keyboard in which LEDs are mounted under every key. This is primarily designed for using a telephone in the dark, and does not deal with selective illumination of keys. U.S. Pat. No. 4,163,883, to Boulanger, entitled Keyboard with Illuminated Keys describes a keyboard for use in an automotive control panel. This system involves a conventional lamp and mirrors, and is probably not suitable for use in a computer keyboard.

U.S. Pat. No. 4,163,138 to Harden, entitled Flush Lighted Flat Keyboard, Assembly, discusses a flat keyboard in which a light under the keys is visible through a fight-transmitting portions of the key. U.S. Pat. No. 5,801,345, to Mikula-Curtis et at., entitled Keyboard, Assembly Incorporating Multiple Lighting Modes For Improving User Feedback, discusses a keyboard incorporating multiple fighting modes and which allows light from an indicator LED to be transmitted to the top of the key. U.S. Pat. No. 4,772,769, to Shumate, entitled, Apparatus for Selective Backlighting of Keys of a Keyboard, discusses use of LEDs to backlight individual translucent keys.

U.S. Pat. No. 5,164,723, to Nebenzahl, entitled Configurable Keyboard, describes a keyboard where LCDs are used to selectively illuminate keys which are generally transparent and mirrors are used to reflect the fight. U.S. Pat. No. 5,408,060, to Muurinen, entitled Illuminated Push Button Keyboard describes a telephone keyboard in which the keys are illuminated in different areas of the key by an LED to indicate different modes of operation. The regional illumination is accomplished by use of multi-colored LEDs and different colored light transmitting materials for the keys. Use in computer keyboards was not described. U.S. Pat. No. 4,551,717, to Dreher, entitled Intelligent Key Display describes a computer keyboard key with a microchip inside to allow programming of the key. In this device the key has an LCD or LED, mounted in the key cap, to indicate the mode of the key. This arrangement requires both a microchip and an indicator device within the key. However, and therefore may be somewhat expensive to manufacture U.S. Pat. No. 5,818,361, to Acevedo, entitled Display Keyboard describes a computer keyboard in which keys have LEDs or LCDs to indicate the key's function during particular software operations. Details of the mechanism for constructing the keys are not given, and only operation requiring driving of the keys by the software program being run by the computer is described.

Based on my observation of the art, then, I have determined that what is needed is a computer keyboard which, in a simple but unmistakable manner, indicates to the user whether the Num Lock key or Telephone key is activated and indicates the current function of the keys.

SUMMARY OF THE INVENTION

It is therefore an object of the present invention to provide a computer keyboard which helps prevent typographical errors.

It is a further object of the invention to provide a computer keyboard which helps the user properly identify active keys.

It is a still further object of the invention to provide a computer keyboard which readily indicates the status of keys activated by the Num Lock or Telephone Lock function keys.

The present invention provides a computer having a light emitting diode (LED) display keyboard device, which lights numeral function keys on a numeric pad/portion or relevant keys of a keyboard required for calculation or dialing, when activated by a number lock key or a telephone lock key for providing an easy and convenient access to the keys by making them readily noticeable. To achieve the above objects, the present invention provides a computer having a LED display keyboard device, a display device, a central processing unit, a ROM, a RAM, and a system bus, the LED display keyboard device including: a number lock (Num Lock) key for activating numeral function keys on a keyboard; a telephone lock key for activating telephone function keys on a keyboard; a controller for lighting respective numeral function keys according to a Num Lock key signal or a telephone lock key signal; and a light emitting device which activates according to a control signal from the controller. In accordance with the present invention, the controller determines a power supply status of a computer and disables a LED display function, if the computer is determined to be supplied by a battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
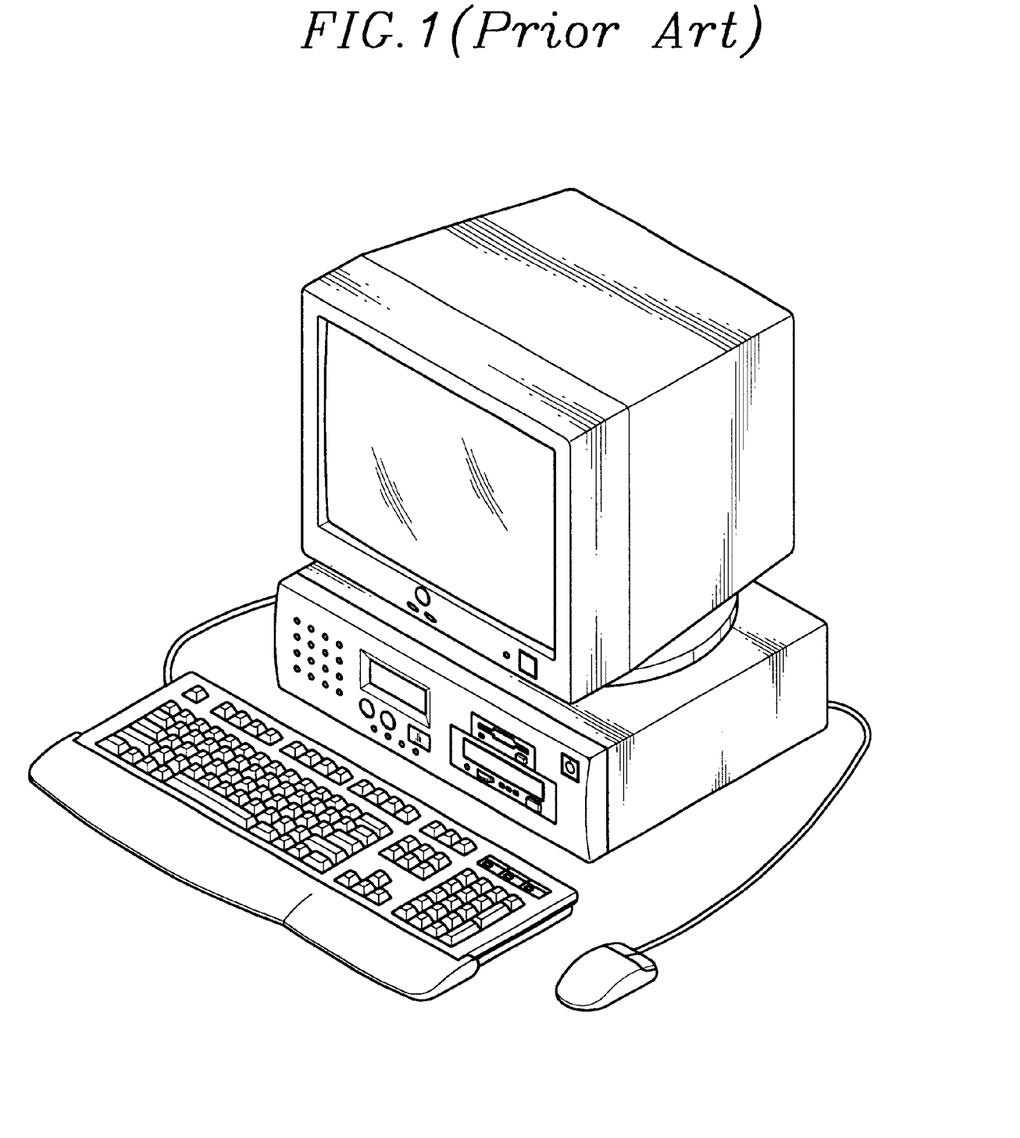
FIG. 1 is a perspective view of a conventional desk-top computer.
Figure 2:
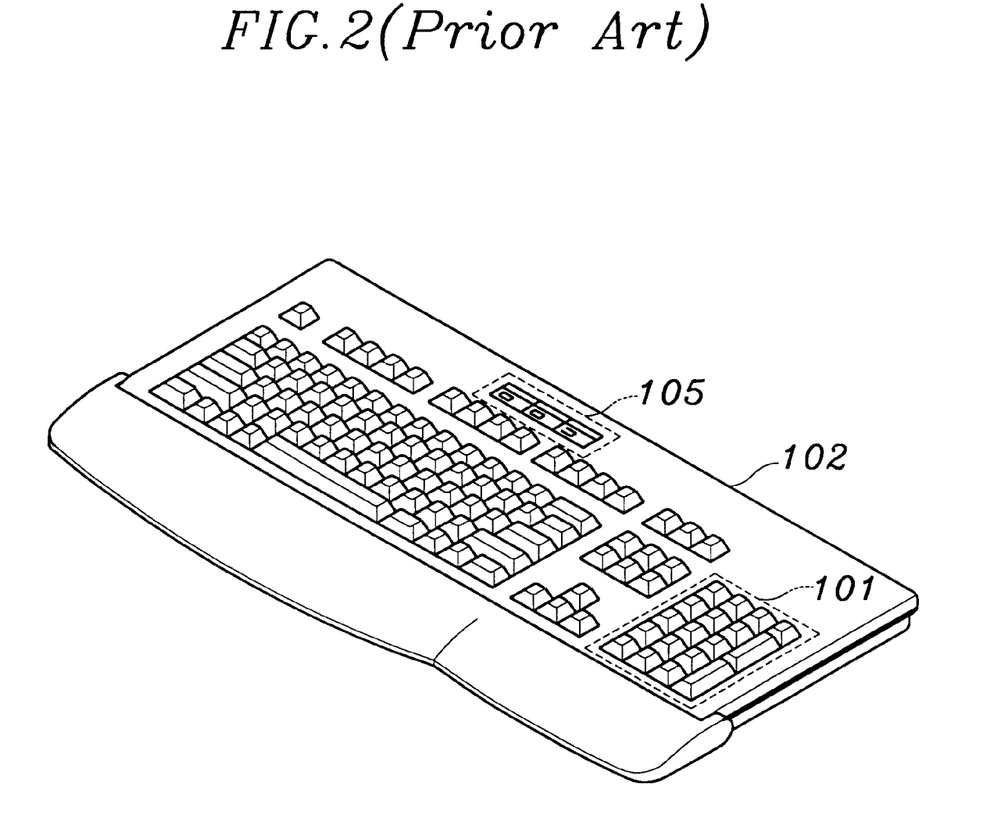
FIG. 2 Is an enlarged perspective view of a keyboard illustrated in FIG. 1.

Turning now to the drawings, the conventional art will be elaborated in conjunction with the attached drawings. As shown by FIGS. 1 and 2, a conventional desk-top computer has numeric pad 101 located on the right portion of a keyboard. During use, when a need to use numeral function keys for a calculation arises, a user can simply activate only the numeral function keys on the numeric pad 101 by pushing a number lock (Num Lock) key, and a Num Lock mode display located on the top of the keyboard lights up. Although the Num Lock mode display is located on the keyboard along with displays 105 for other functions, the display is not readily apparent to a user and serves only as a minimal reminder. Failure to notice the display causes inconvenience and typographical errors.

Figure 3:
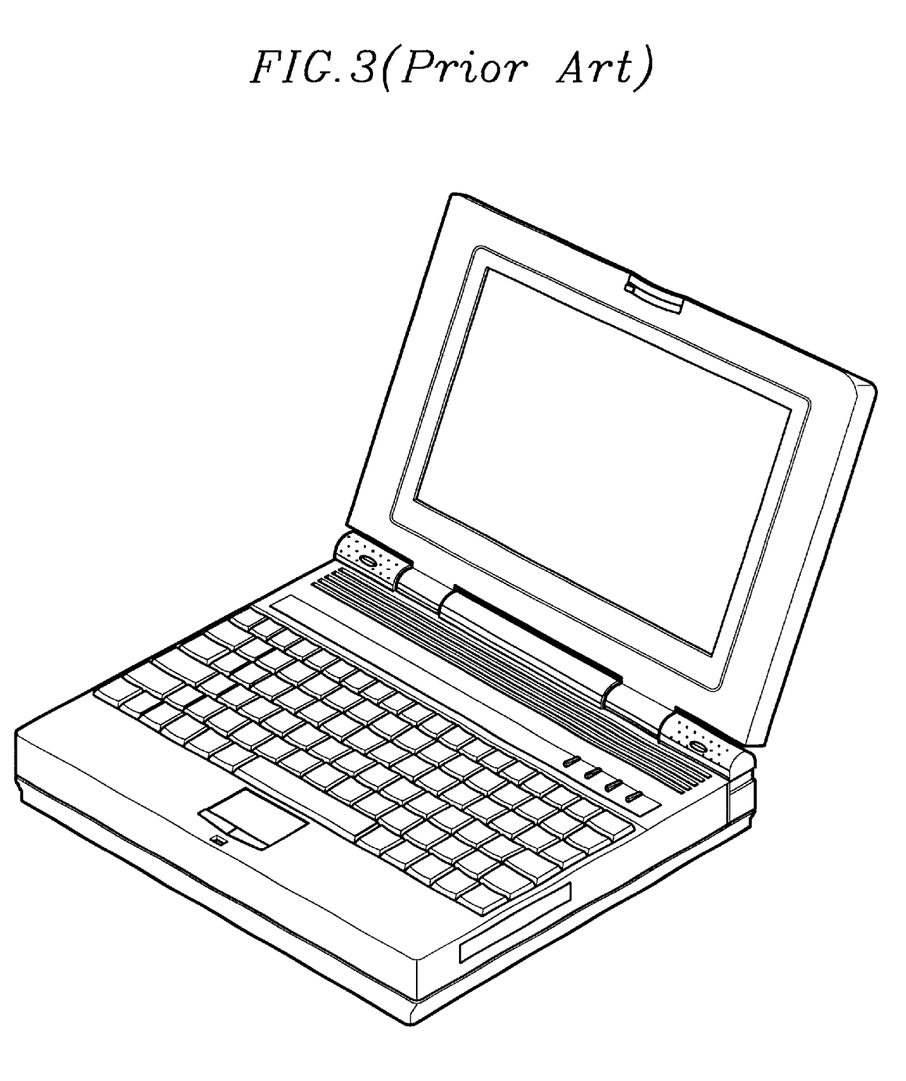
FIG. 3 is a perspective view of a conventional portable computer.
Figure 4:
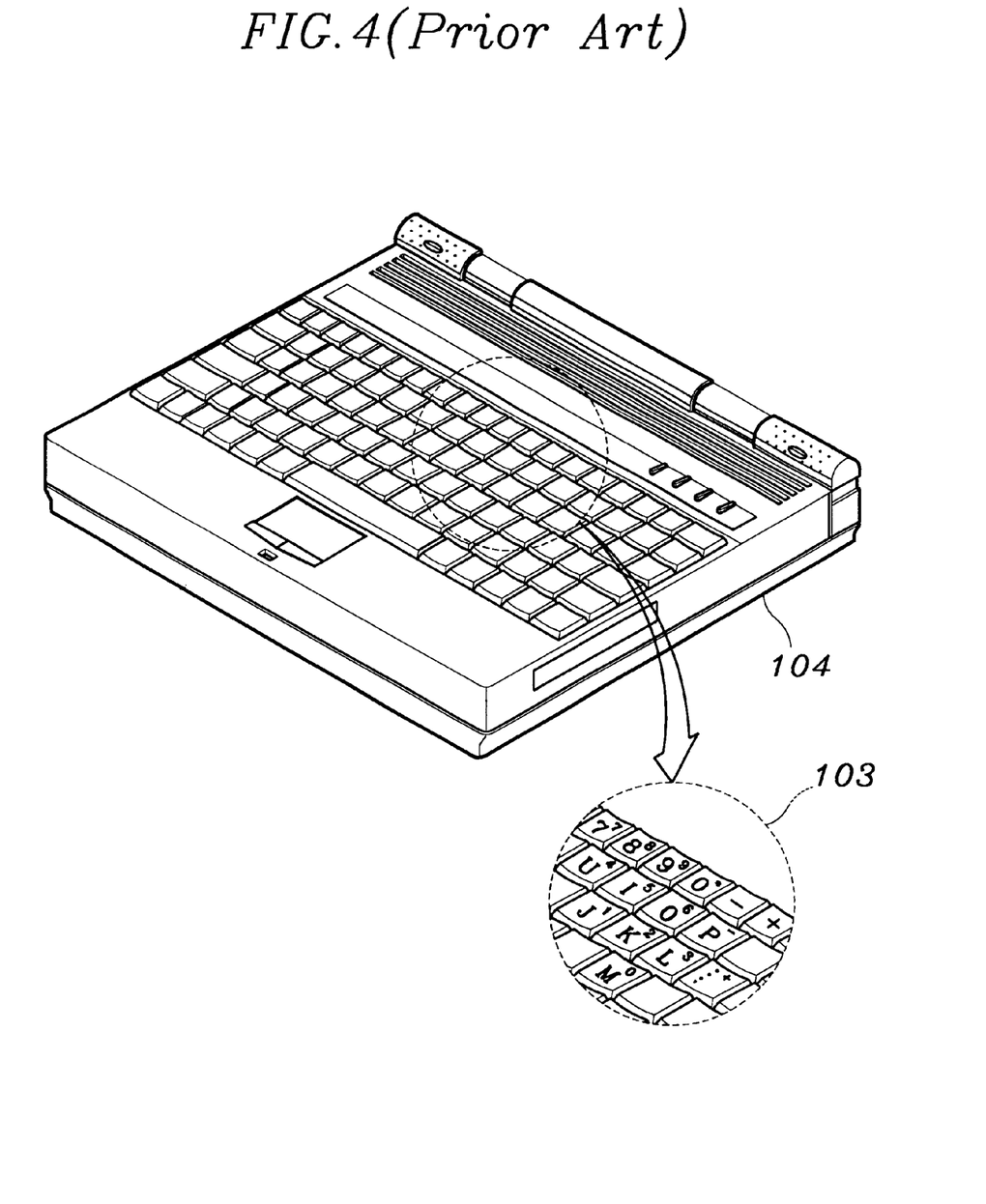
FIG. 4 is an enlarged perspective view of a keyboard of the conventional portable, computer illustrated in FIG. 3.

In portable computers, as shown by FIGS. 3 and 4, numeric portion 103 is located in the center of keyboard 104. Similarly to the desk top computers, a user can activate the numeral function keys of numeric portion 103 by simply pushing its Num Lock key. Unlike the desk top computers, the numeral function keys are inconveniently located in the center of the keyboard indicated by small numbers. Thus it is even easier for a user to be confused about the function of these keys, consequently resulting in typographical errors.

Figure 5:
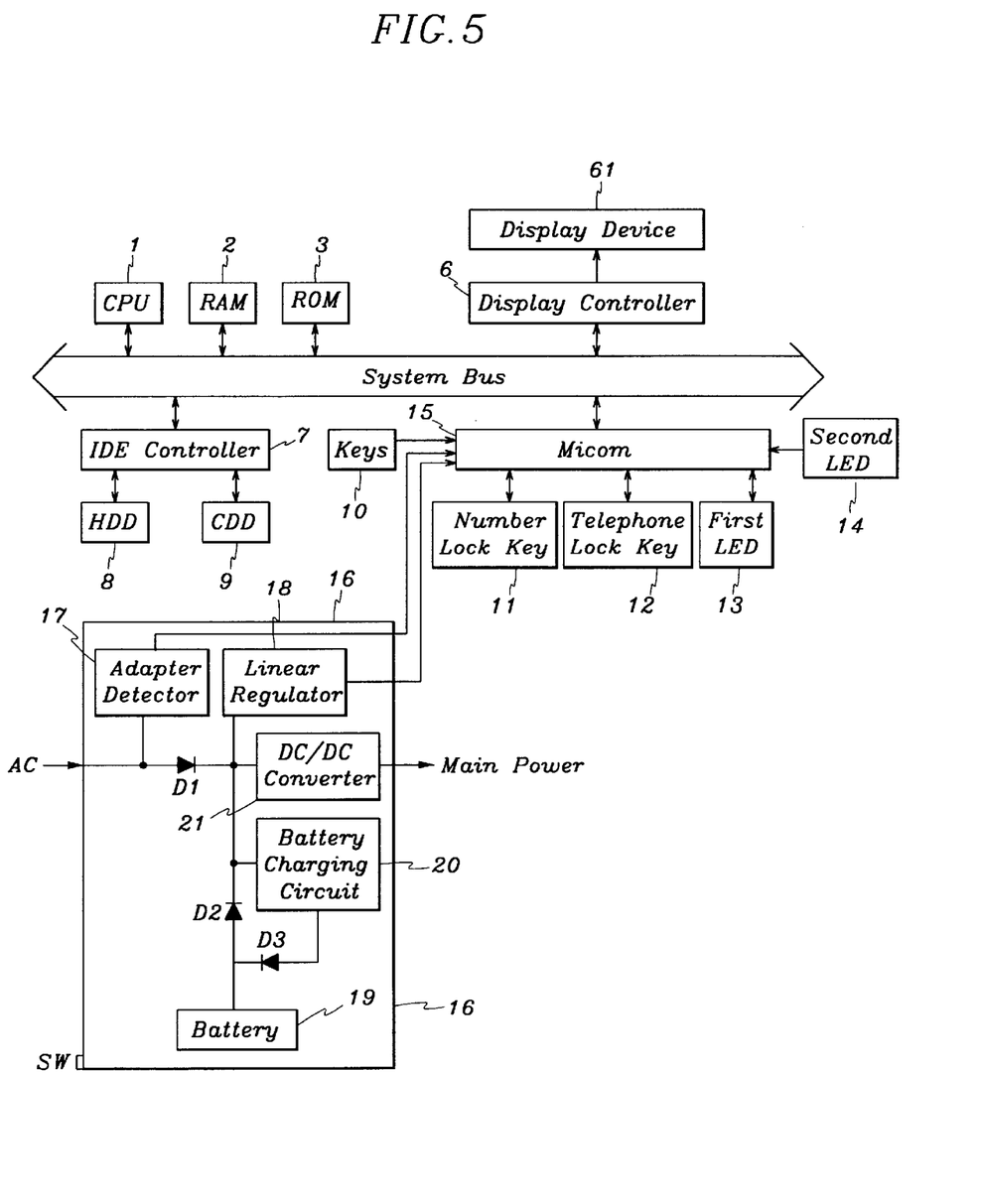
FIG. 5 is a block diagram of a computer having a light emitting diode (LED) display keyboard device according to a first embodiment of the present invention.

Preferred embodiments of the present invention will now be described in detail with reference to the accompanying drawings. Wherever possible, the same reference number will be used throughout the drawings to refer to the same or like parts. FIG. 5 is a block diagram which shows a first preferred embodiment of a computer having a light emitting diode (LED) display keyboard device according to the present invention. A computer according to the first preferred embodiment comprises display device 5, display controller 4, central processing unit (CPU) 1, ROM 3, IDE controller 7, hard disk drive 8, CD-ROM drive 9, power supply device 16, and system bus 6.

The computer further comprises number lock (Num Lock) key 11, telephone lock key 12, keys 10 (remaining keys on a keyboard), NBCOM (microcomputer) 15 for controlling lighting of numeral function keys from keys 10 corresponding to the function indicated by an activation of Num Lock key 11 or telephone lock key 12, and first light emitting diode (LED) device 13 and second light emitting diode (LED) device 14 for providing light according to a signal from MICOM 15.

Additionally, the power supply device 16 comprises an adapter detector 17, a linear regular 18, a battery 19, a battery charging circuit 20, a DC/DC converter 21, and diodes D1, D2 and D3.

Operations of the computer having the LED display function keyboard device according to the first preferred embodiment will now be described in detail. When power is supplied to the computer, CPU 1 executes a power on self-test (POST) process by loading BIOS from ROM 3 into RAM 2, and controls IDE controller 7 to load and execute a boot program from hard disk drive 8 and completes a booting process. At this stage, the computer is ready while remaining in a wait state to receive an instruction from a user, and desired data can be input to the computer by selecting Num Lock key 11, telephone lock key 12, or keys 10.

Figure 7:
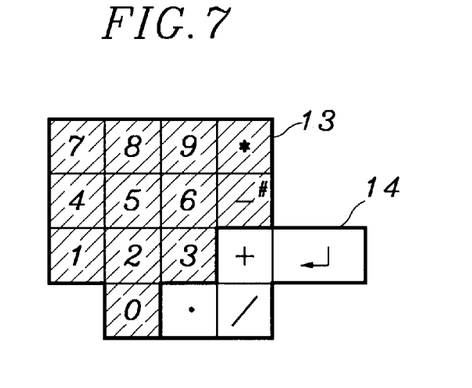
FIG. 7 is a detailed diagram showing a numeral function key arrangement having a LED display for a telephone lock mode of a desk-top computer in accordance with the first embodiment.

When a user selects telephone lock key 12, MICOM 15 senses the selection and outputs a control signal to first LED device 13. First LED device 13 is activated and the numeral function keys along with star and pound keys from keys 10 corresponding to the command of telephone lock key 12 are lighted, as shown by the shadow portion in FIG. 7.

Figure 11:
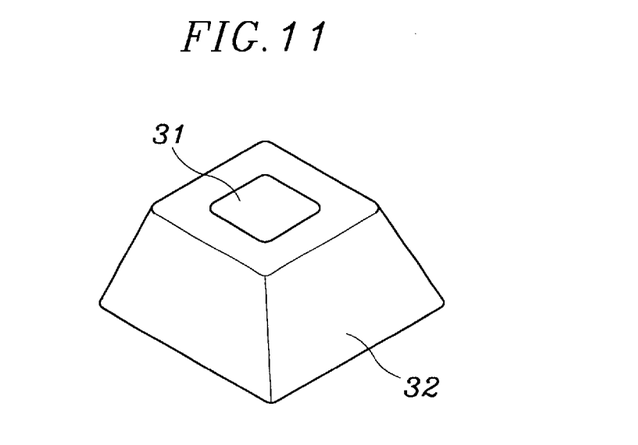
FIG. 11 is a perspective view of a keyboard cap of the LED display keyboard device of the computer in according to the embodiments of the present invention.

Here, as shown in FIG. 11, the star key, the pound key, and the numeral function keys which correspond to the selection of telephone lock key 12 are manufactured from a transparent material and partially colored to comprise transparent region 31 on cap 32, through which light can easily pass. At this time, when a user presses telephone lock key 12 again, NUCOM 15 senses the selection and deactivates the lighting of the keys. But if a user selects Num Lock key 11, NPCOM 15 senses the selection and outputs a control signal to first and second LED devices 13 and 14 respectively. First and second LED devices 13 and 14 are activated and the numeral function keys along with star, operation, and pound keys from keys 10 corresponding to the command of Num Lock key 11 are lighted, as shown by the shadow portion in FIG. 8. This key arrangement having the LED display includes the pound key, which is not available in the numeric pad of the conventional keyboards.

Figure 8:
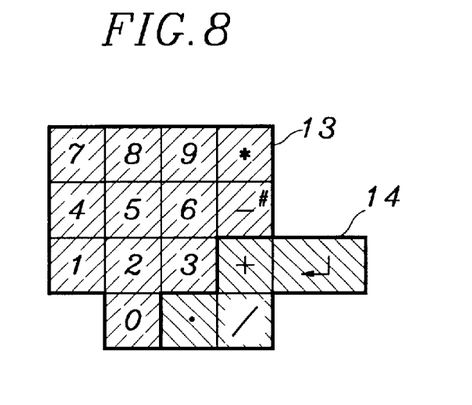
FIG. 8 is a detailed diagram showing a numeral function key arrangement having a LED display for a number lock mode of the desk top computer in accordance with the first embodiment.

Here, the star key, the pound key, the operation keys and the numeral function keys which correspond to the selection of Num Lock key 11 are manufactured from a transparent material and partially colored so that fight can easily pass through it. At this time, if Num Lock key 11 is pressed again, MICOM 15 senses the selection and deactivates the lighting.

Figure 6:
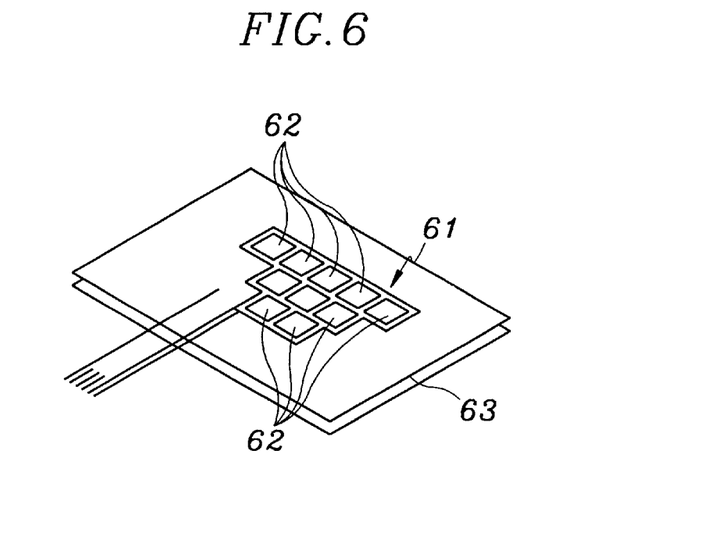
FIG. 6 is a perspective view of a flexible print circuit of the LED display keyboard device of the computer in accordance with the first embodiment.

The above described first and second LED devices 13 and 14, respectively, each comprises light emitting diode 62 installed on flexible print circuit 61 or has light emitting diode 62 connected by an optic cable. Flexible print circuit 61 can be attached to conventional keyboard membrane 63 on a region where the corresponding function keys are to be lighted, while connected by a signal wire. The signal wire is designed to activate the light emitting diode of first LED device 13 to light the numeral function, star, and pound keys when telephone lock key 12 is selected, and is also designed to activate the fight emitting diodes of first and second LED devices 13 and 14 to light the numeral function, star, pound and operation keys on the numeric pad when Num Lock key 11 is selected. As in conventional computers, inputs from keys 10 are sent to central processing unit 1 via MICOM 15 to be processed.

Figure 9:
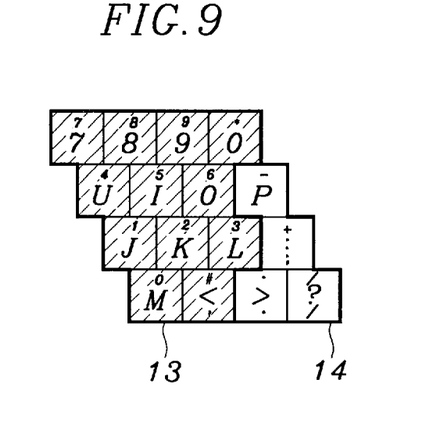
FIG. 9 is a detailed diagram showing a numeral key arrangement having a LED display for a telephone lock mode of a portable computer in accordance with a second embodiment of the invention.
Figure 10:
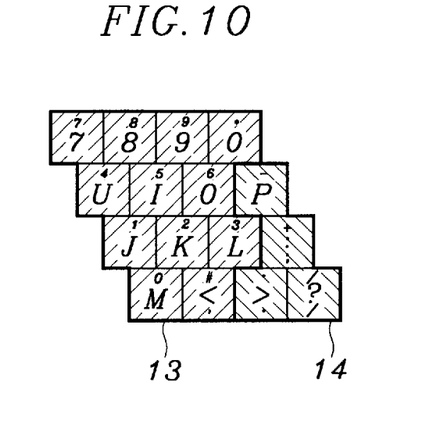
FIG. 10 is a detailed diagram showing a numeral key arrangement having a LED display for a number lock mode of the portable computer in accordance with the second embodiment.

FIGS. 9 and 10 are detailed diagrams showing the numeral function key arrangements of a numeric portion having a LED display for a portable computer in accordance with a second preferred embodiment of the present invention. Operation of its internal structure is the same as described for the first preferred embodiment. FIG. 9 shows an arrangement of keys such as numeral function, star, and pound keys at their lighted state, when telephone lock key 12 is selected, while FIG. 10 shows an arrangement of keys such as the numeral function, star, pound, and operation keys at their lighted state when Num Lock key 11 is selected.

In the second preferred embodiment, when a calculating or telephone function is carried out in a windows environment, corresponding function keys required are automatically ]it without having to additionally select number lock or telephone lock keys. This LED display feature is made possible by having an appropriate program catch the operations of calculating or telephone function when they are executed. The above process is realized by having a windows application program recognizing the activation of either the calculating or telephone function, and through a BIOS the operations of MICOM can be controlled.

Figure 12:
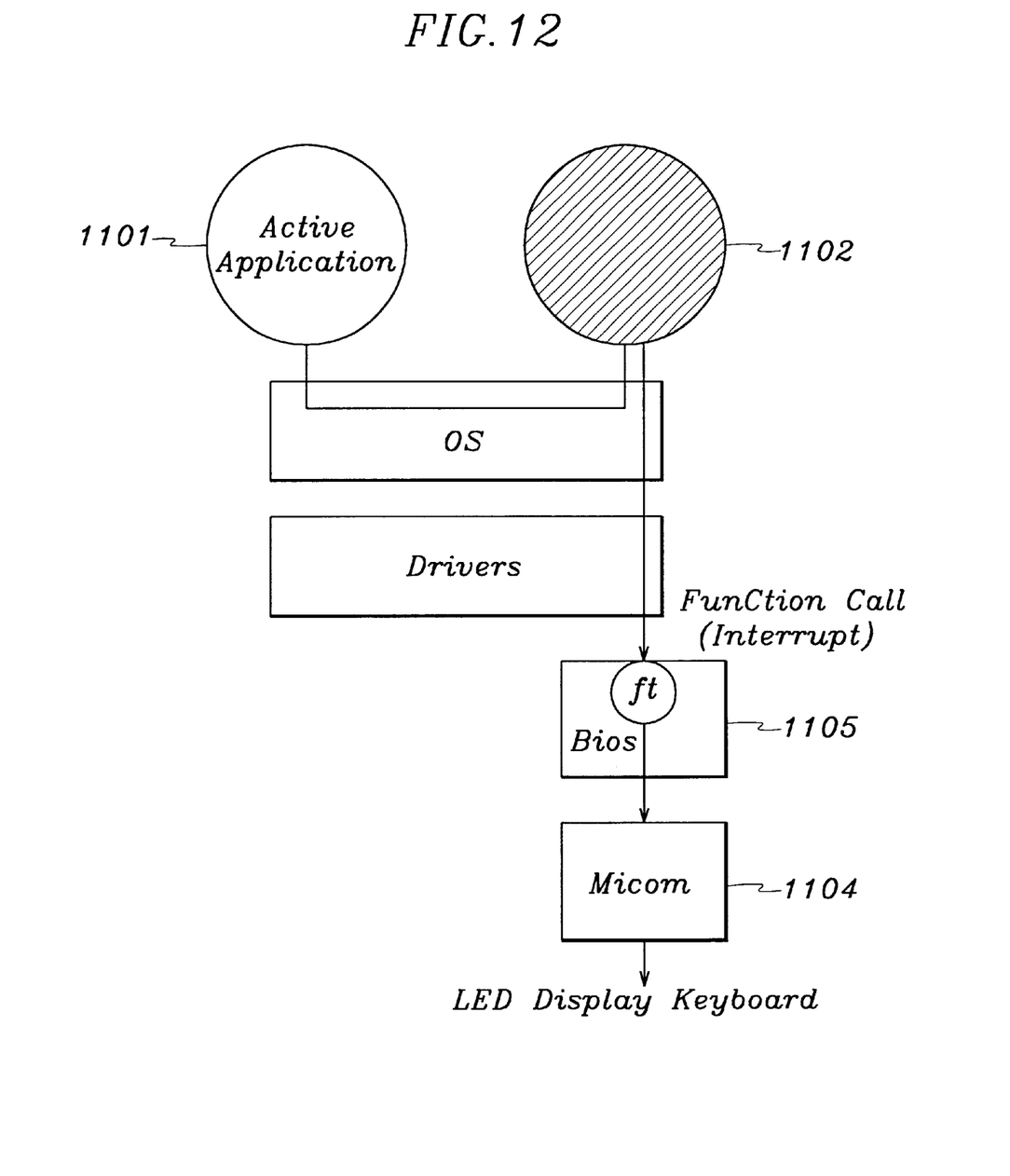
FIG. 12 is a schematic diagram showing an operating procedure of the LED display keyboard device of the computer using a catch application and a BIOS according to the embodiments of the present invention.
Figure 13:
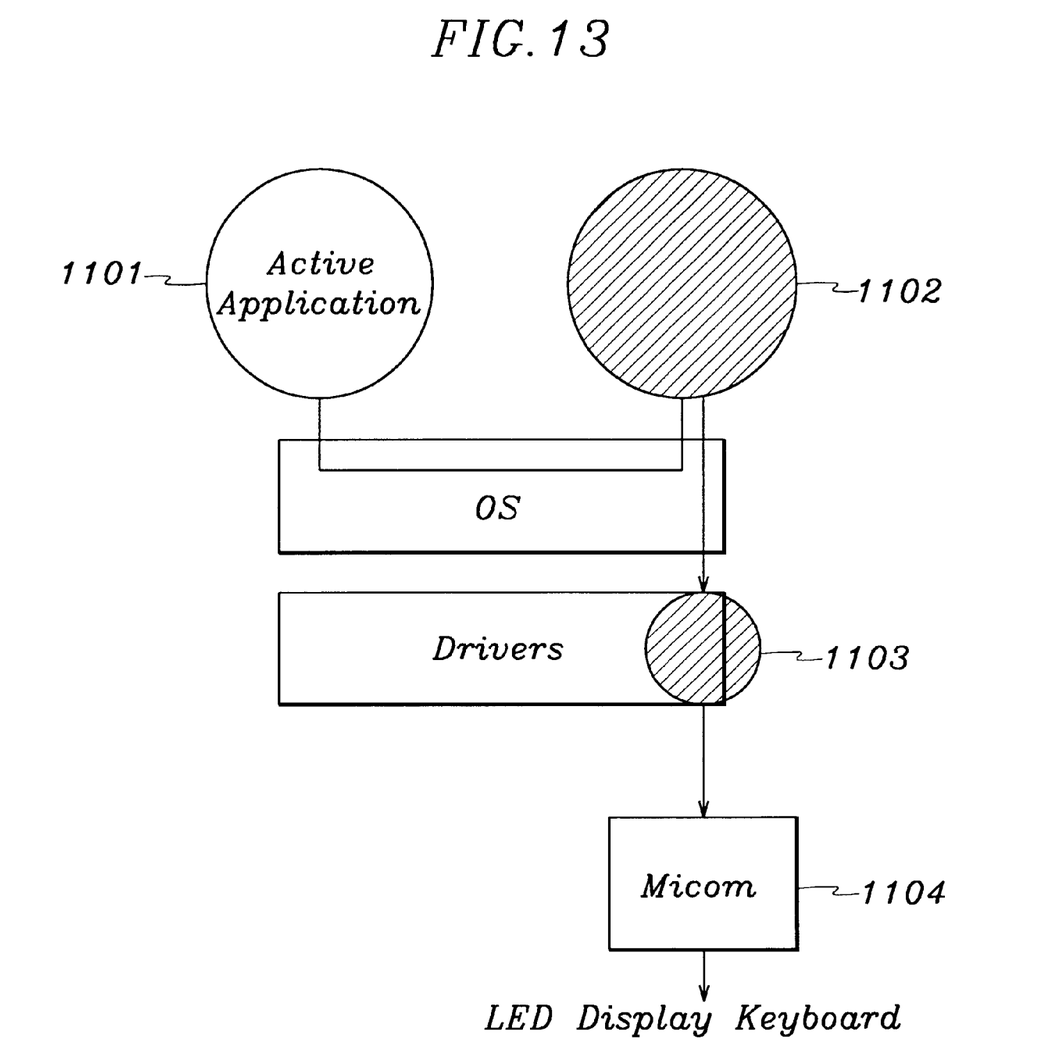
FIG. 13 is a schematic diagram showing an operating procedure of the LED display keyboard device of the computer using a catch application and a relevant driver according to the embodiments of the present invention.

FIGS, 12 and 13 show a schematic diagram of an operating procedure of a computer having a LED display keyboard device according to the second preferred embodiment. As shown by FIG. 12, when active application 1101 is executed, catch application 1102 for detecting a function specific application through an operating system (OS), recognizes active application 1101 being executed. Next, by utilizing the function of BIOS, catch application 1102 controls MICOM 1104 to activate a relevant light emitting diode.

In FIG. 13, catch application 1102 detects active application 1101 being activated, as described for FIG. 12; however, specific function driver 1103 receives a signal from catch application 1102 and controls the MICOM 1104 to activate a relevant light emitting diode.

In addition, the controller for controlling the lighting of keys corresponding to a Num Lock key signal or a telephone lock key signal, such as MICOMs 15 and 1104, also determines whether a power supply to the computer is from a wall-outlet or a battery, and disables the light entitling device if the power is determined to be supplied from the battery.

As described above, the preferred embodiments of the present invention provides a readily noticeable and convenient LED display keyboard device which lights corresponding function keys on a numeric pad/portion for a calculating or telephone function when its respective number lock key or telephone lock key is selected. Also, by providing a pound key, which is not available in the numeric pad/portion of the conventional keyboard, the calculating or telephone function of a computer can be executed more easily.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A computer, comprising:

central processing unit;

ROM, a RAM and a system bus connected to said central processing unit;

a display device; and a keyboard, comprising:
  a numerical keypad;
  a number lock key for activating certain of said keys of said numerical keypad for a calculating function;
  a telephone lock key for activating certain of said keys of said numerical keypad for a telephone function;
  a plurality of lights mounted under said keys of said numerical keypad; and a controller connected to said number lock key, said telephone lock key and to said lights for activating selected of said fights to illuminate selected keys of said numerical keypad when said number lock key or said telephone lock key is depressed.

2. The computer of claim 1, further comprising that:

when said number lock key is depressed, the keys of said numerical keypad corresponding to 0, 1, 2, 3, 4, 5, 6, 7, 8, 9,".", *, −, /+, and "enter" are illuminated.

3. The computer of claim 1, further comprising that:

when said telephone lock key is depressed, the keys of said numerical keypad corresponding to 0, 1, 2, 3, 4, 5, 6, 7, 8, 9, # and * are illuminated.

4. The computer of claim 1, where each of said lights comprises a light emitting diode.

5. The computer of claim 1, further comprising:

a flexible printed circuit containing said fights, said printed circuit being attached to the membrane of said keyboard under the keys of said numerical keypad.

6. The computer of claim 1, further comprising:

software means for catching a mode selection of telephone lock or number lock mode; and said controller activating selected of said lights when said selection is caught.

7. A computer, comprising:

a display device displaying graphic video images;

a central processing unit driving said display device;

a memory connected to said central processing unit;

a system bus carrying signals between said memory and said central processing unit and said display device; and a display keyboard device, comprising:
  a number lock (Num Lock) key activating keys on a keyboard corresponding to a calculating function;

a telephone lock key activating keys on a keyboard corresponding to a telephone function;

a controller controlling illuminating of keys corresponding to a Num Lock key signal or a telephone lock key signal; and a light emitting device illuminating keys corresponding to a Num Lock key signal or a telephone lock key signal, being activated/deactivated by a control signal from the controller.

8. The computer of claim 7, further comprising:

software means for catching a mode selection of telephone lock or number lock mode; and said controller activating selected of said lights when said selection is caught.

9. The computer of claim 7, wherein the keys are manufactured from a transparent material and partially colored to allow passage of light.

10. The computer of claim 7, wherein the light emitting device comprises a light emitting diode.

11. The computer of claim 7, wherein the controller determines whether a power supply to the computer is from a wall-outlet or a battery, and disables the light emitting device if the power is determined to be supplied from the battery.

12. The computer of claim 7, wherein the keys corresponding to a calculating function include the number keys 0–9, the star key, the slash key, the minus sign, the plus sign, the decimal point or period, and the equals sign.

13. The computer of claim 7, wherein the keys corresponding to the telephone function include the number keys 0–9, the pound sign, and the star key.

14. A method of illuminating a portion of a keyboard of a computer, comprising the steps of:

activating either a number lock key or a telephone lock key;

activating a controller for illuminating keys corresponding to a number lock key signal or a telephone lock key signal; and illuminating, by using LED's underneath partially transparent material on each key, only those portions of the keyboard necessary for carrying out the functions of numerical calculations or telephone communication respectively.

15. The method of claim 14, further comprising:

disabling the illumination of said portion of said keyboard if a power supply to said computer is a battery.

16. A method for illuminating only a portion of a keyboard for a computer, said method comprising the steps of:

activating a windows application program recognizing the activation of either the calculating or the telephone function;

activating a controller for illuminating keys in correspondence to the windows application program activated; and illuminating, by using LED's underneath a partially transparent material on the top side of each key, only those portions of the keyboard necessary for carrying out the functions of the windows application program that is activated.

17. The method of claim 16, further comprising:

disabling the illumination of said portion of said keyboard if a power supply to said computer is a battery.

* * * * *